United States Patent [19]

Sato et al.

[11] 4,216,409
[45] Aug. 5, 1980

[54] MULTI-CAVITY KLYSTRON DEVICE

[75] Inventors: Hisaaki Sato; Morio Shintani; Takayoshi Shinozaki; Takuichi Tsuchiya; Toshio Asai, all of Tokyo, Japan

[73] Assignee: Nippon Electric Co., Ltd., Tokyo, Japan

[21] Appl. No.: 962,715

[22] Filed: Nov. 21, 1978

[30] Foreign Application Priority Data

Nov. 25, 1977 [JP] Japan .................. 52-141932

[51] Int. Cl.² ............................................. H01J 25/10
[52] U.S. Cl. .................................. 315/5.46; 315/5.37; 315/5.47; 330/45; 331/83; 334/21
[58] Field of Search ................. 334/10, 21; 307/247, 307/269; 328/136, 147; 315/5.39, 5.46, 5.47; 330/45; 331/7, 8, 35, 83

[56] References Cited

U.S. PATENT DOCUMENTS

| 2,586,497 | 2/1952 | Ginzton et al. ............. 331/35 X |
| 2,972,718 | 2/1961 | Alperin et al. ............. 328/136 X |
| 3,325,671 | 6/1967 | Biechler et al. ............ 315/5.46 X |
| 3,617,799 | 11/1971 | Schmidt et al. ............. 315/5.39 |
| 3,624,518 | 11/1971 | Dildy, Jr. .................. 307/269 |
| 3,947,697 | 3/1976 | Archer et al. .............. 307/269 |

FOREIGN PATENT DOCUMENTS 179389   7/1966   U.S.S.R. .................. 315/5.47

Primary Examiner—Saxfield Chatmon, Jr.
Attorney, Agent, or Firm—Blakely, Sokoloff, Taylor & Zafman

[57] ABSTRACT

A multi-cavity klystron device having a plurality of resonance cavities, comprising a plurality of movable elements, each of which is mounted on each of said resonance cavities and which is adapted to change the resonance frequency in each cavity, a plurality of tuning means for giving a reciprocal movement to each movable element against a resilient member provided therefor, a plurality of pulse motors coupled to the tuning means, and a preset means for controlling pulse supply to each pulse motor, wherein a predetermined number of pulses stored in the memory units of the preset means are selectively applied to the pulse motors to rotate each pulse motor in correspondence with the number of pulses, thereby changing each resonance frequency of each cavity.

9 Claims, 3 Drawing Figures

MULTI-CAVITY KLYSTRON DEVICE

BACKGROUND OF THE INVENTION

The present invention relates to a multi-cavity klystron, more particularly to a multi-cavity klystron of the class wherein an electron beam is made to travel along a straight path in the cavity and the resonance frequency of each cavity resonator which is arranged along the path of electron beam is able to be preset.

The multi-cavity klystron generally comprises an electron gun which is adapted to produce an electron beam, a collector means for catching electrons emitted, and a high frequency circuit having a plurality of cavity resonators for making the electron beam interact with micro waves input, all the constituents above are arranged in one axis and said high frequency circuit further comprises a plurality of cavity resonators. With this construction, a high voltage is produced in the intermediately located cavity resonator due to the modulated electron flow formed in the cavity in front, thereby the electron flow is further modulated in its velocity. As a result, the operating frequency and gain is largely improved as compared with the two-cavity type klystron.

Generally, as mentioned above, the klystron is provided with means capable to changing the resonance frequency of each cavity resonator so as to change the band characteristics and usable channels. In principle, for changing the resonance frequency, there would be considered means adopting the following three methods.

(1) The C-tuning method in which capacitance of the cavity is adjusted, (2) The L-tuning method in which inductance of the cavity is adjusted, and (3) The combination of the above two methods.

In a conventional type means for adjusting the resonance frequency, there are provided independent adjusting means each of which follows either one of the above adjusting method, and upon adjustment, each means is adjusted by an instrument proper thereto for obtaining a necessary characteristics thereof. The adjustment above, however, would result in a very complicated and a time consuming work in general, unless performed by one trained well in that field.

For the purpose of solving difficulty as described above, a preset tuner mechanism has been proposed, which not only one trained well but also a beginner can be performed a suitable adjustment in a short time without a sophisticated measuring instrument. In this mechanism, there is included means which can specify in advance a particular resonance frequency, i.e. channel and is manually and simply set a desired resonance frequency. For instance, a multi-cavity micro wave gang-operation tuner has already been disclosed in U.S. Pat. No. 3,617,799 patented Nov. 2, 1971. At present, however, there is used the same type means as described above, or the one that is modified therefrom but keeping the same principle as the above. The klystron having such a preset tuner comprises in general movable elements provided in each cavity resonator for changing the resonance frequency, tuning rods coupled with each movable element, a cam which contacts with the other end of each tuning rod and selectively determine the position of the element in the cavity resonator, a cam gear with said cam, which is used for selecting a channel, a channel selection knob for rotating said cam gear, a control means for engaging or disengaging each tuning rod with or from said cam, and a knob for controlling said control means. Each gear is constructed in such a way that it can rotate co-operatively or jointly by the operation of the channel selecting knob.

When the resonance frequency is needed to change, the control knob is firstly operated so as to disengage the tuning rod from the knob by the control means, and then the channel selection knob is operated so as to face the cam corresponding to a predetermined resonance frequency to the other end of each tuning rod, and further, in keeping this condition, each control knob is reversely operated so as to contact each tuning rod with each cam. By this operation, the position of each movable element in each cavity resonator is determined, thereby the electrical variables in the cavity resonator such as capacitance, inductance, or the both in the resonator coming to have predetermined values and a micro wave energy with a desired frequency characteristics being output.

In such a preset tuner mechanism as described above, however, a preset value is determined by the cam that is provided along the periphery of the cam gear. In other words, the preset value is determined by using the mechanical memory means, so that the following drawbacks will be often observed.

(1) In view of the structure of the multi-cavity klystron, the cam gear provided corresponding to each cavity resonator is restricted in its size, so that the number of cams to be mounted thereon is to be naturally limited. For instance, in the klystron five cavities of 6 GHz, six cams are maximum to be accepted by the cam gear, which make use of six channels available.

(2) When an operating frequency of the klystron becomes very high, the size of the cavity of the klystron becomes essentially small so that the size of the preset tuner mechanism is also required to be smaller. In the conventional preset tuner mechanism, however, various parts as described above have to be included, so that a considerably large space is required for accomodating them. Accordingly, a limitation is imposed for making the mechanism small, and even if it should be possible to miniaturize parts for the mechanism installing or assembling the same would become difficult. As described above, there must be considered a limitation for the size of the mechanism in view of the operating frequency of the klystron. On one hand, there is another demand that channels are to be more increased in their number, and there is still another demand that there should be provided a preset tuner mechanism which can be installed in a high frequency, operated klystron.

SUMMARY OF THE INVENTION

Accordingly, it is an object of this invention to provide an improved multi-cavity klystron device wherein the above difficulties can be obviated and a number of preset channels can be provided.

It is another object of the invention to provide a multi-cavity klystron device wherein there is provided a novel preset mechanism which can be used in a high frequency klystron in which cavities are made smaller.

It is a further object of the invention to provide a multi-cavity klystron device wherein the structure of the preset tuner mechanism which is be coupled to each cavity resonator can be simplified and further the preset value can be arbitrally increased or decreased.

It is still another object of the invention to provide a multi-cavity klystron device wherein the band characteristic can to be preset freely in the range of the structually determined band width.

It is still another object of the invention to provide a multi-cavity klystron device which may be remotely controlled.

To realize the above objects, there is provided the multi-cavity klystron device wherein a plurality of pulse motors are used and wherein means for storing and selecting the preset value are provided separately from the preset tuning mechanism coupled with the cavity resonator.

According to one embodiment of the present invention, there is provided a multi-cavity klystron device using a klystron of the type which includes an electron gun for generating an electron beam, a collector means for collecting the electron beam, and a high frequency circuit having a plurality of cavity resonators for making the electron beam interact with input micro waves, comprising a preset device, and a tuning mechanism controlled by said preset device, said tuning mechanism including a plurality of movable elements, each of which is installed on each of said cavities for varying the resonance frequency of the cavity, a plurality of pulse motors each of which is provided corresponding to each of said movable elements, and means for driving each of said movable elements in response to the rotation of each said pulse motor, said preset device being coupled with said pulse motor through cables and including a plurality of memory units for storing preset values of resonance frequencies predetermined in connection with respective rotation amount of said pulse motors and means for selectively energizing said memory units so as to drive corresponding pulse motors until a desired resonance frequency is obtained.

These objects and advantages of the present invention will be more fully understood from the following detailed description of the preferred embodiments with reference to the accompanying drawings.

DESCRIPTION OF THE PREFERRED EMBODIMENT

Figure 1:
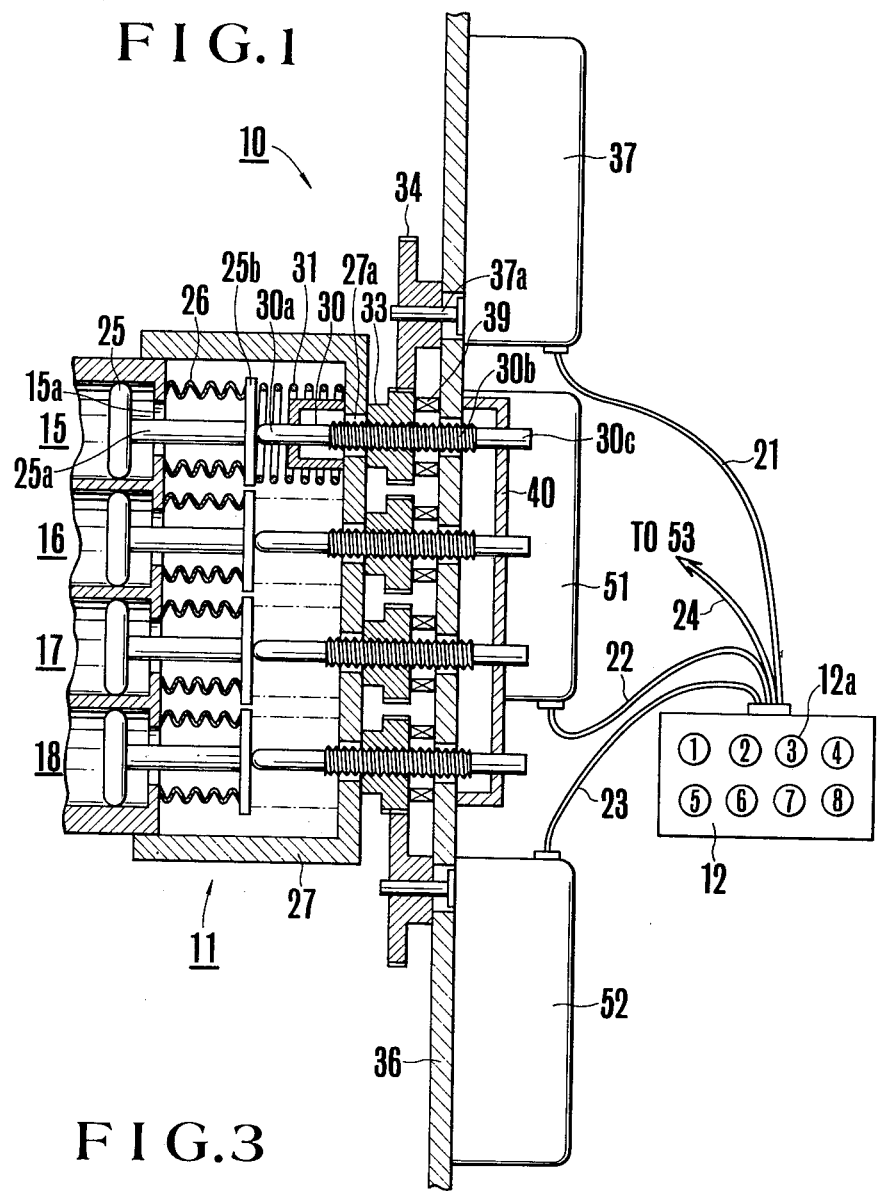
FIG. 1 shows a cross-section of the main portions illustrating one embodiment of the multi-cavity klystron device according to the present invention.
Figure 3:
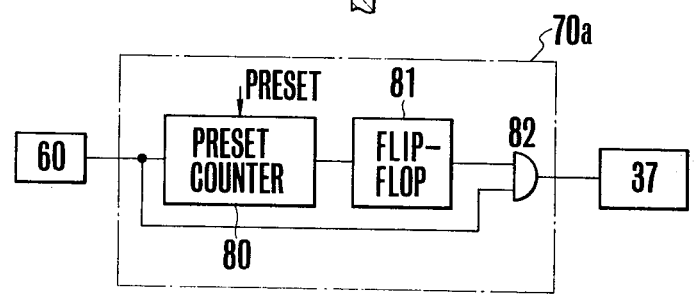
FIG. 3 shows an embodiment of the circuit of the memory units shown in FIG. 2.
Figure 2:
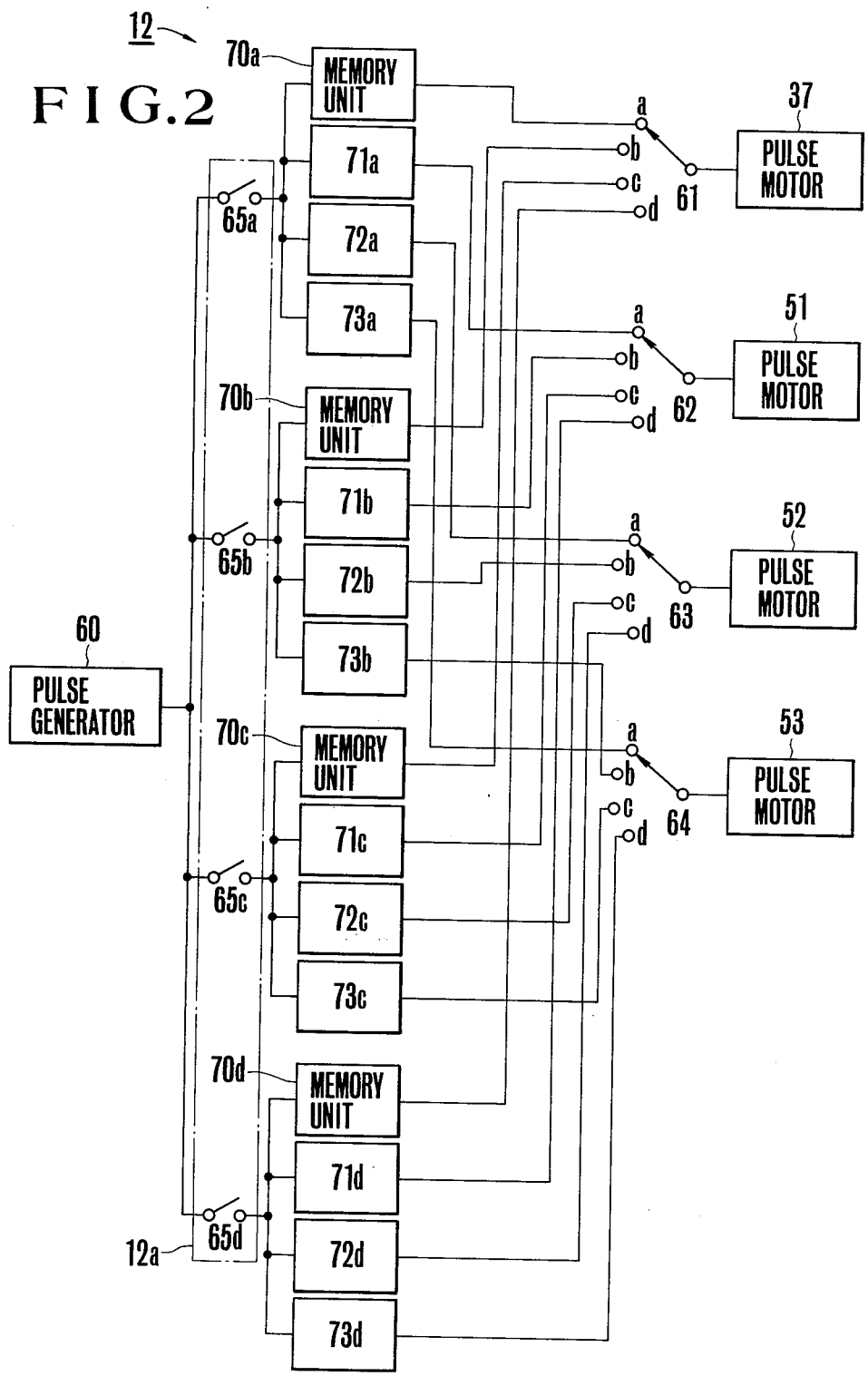
FIG. 2 shows a wiring diagram of a preset device for a preset tuner of the multi-cavity klystron device shown in FIG. 1.

Referring now to FIGS. 1 to 3, there is seen an embodiment of the multi-cavity klystron device according to the present invention, in which a preset tuner 10 is incorporated with the multi-cavity klystron having the four cavity resonators. The preset tuner 10 is constituted with a tuning mechanism 11 and a preset device 12. The tuning mechanism 11 is assembled in one unit and provided with cavity resonators 15, 16, 17 and 18 of the multicavity klystron while the preset device 12 is separately provided from the tuner mechanism and is connected to said mechanism through cables 21, 22, 23, and 24.

Now, the tuning mechanism will be discussed in the following by taking the cavity 15 as a typical example.

In the cavity 15, there is provided a movable element or plate 25 which is adapted to change the resonance frequency of the cavity 15. The element 25 is formed so as to change any of the capacitance and/or the inductance of the cavity as described in the foregoing. The movable element is provided a rod 25a extending through an opening 15a of the cavity. The movable element 25 is provided with a rod member 25a which horizontally extends from about the center of the movable element to the outside of the cavity through an opening 15a. Said extending rod member is made to terminate at about the center of another plate member 25b which is positioned substantially in parallel with said movable element 25, thus forming T-shape therebetween. Between one end of the cavity and one face of said plate member 25b, there is provided a bellows 26 such that vacuum in the cavity 15 is strictly kept. The said movable element 25 is prepared so as to move in the direction perpendicular to the electron flow traveling in the cavity 15. In addition, there is provided a frame 27 which has an opening as well as a bottom and of which the cross section in ]-shaped. The opening of said frame 27 is secured on the cavity end so as to cover the same while the bottom of said frame is provided with a plurality of holes which allows tuning rods such as a tuning rod 30 to penetrate through corresponding holes like a hole 27a. The end of the penetrating tuning rod 30 is made to contact with said plate member 25b at about the center thereof. The tuning rod 30 is constituted with the portion 30a supported by a support member which is mounted on the frame 27 movably in the direction of the cavity, a threaded portion 30b extending from said portion 30a and a portion 30c of which the cross section is formed in the elliptical shape and which further extends from the portion 30b.

The frame 27 is further provided with a tension spring 31 one end of which is connected to the plate member 25b so as to pull always the movable element 25 in the outward direction. The threaded portion 30b of the tuning rod 30 is screwed in the center of a gear 33, which in turn is through another gear 34 connected to a driving shaft 37a of a pulse motor 37 which is mounted on a fixed frame 36 which fixes the klystron or serves as a cover of the same. Between the gear 33 and the frame 36, there is provided a thrust bearing 39. A support member 40 having the ]-shape in its cross-section is provided on the surface opposing to the surface of the frame 36, on which the gears 33 and 34 are arranged. The portion 30c of the rod 30 which has an elliptical shape in its cross section, is inserted into said support member 40 so as to move in the longitudinal direction of the cavity but not to make rotation.

The pulse motor 37 is connected through cables 21 to the preset device 12.

The foregoing description has been made in terms of the cavity 15, but the same is applicable to other cavities 16 to 18. In FIG. 1, the reference numericals 51, 52, and 53 designate pulse motors (the one corresponding to 53 is not shown) which are installed on the frame 36. Corresponding to the cavities 16 to 18. These pulse motors 51 through 53 connected to the preset device 12 through the cables 22 to 24 in the same manner as the pulse motor 37.

In the multi-cavity klystron with such a structure as described above, when a desired channel selection switch button 12a of the preset device 12 is pushed, the desired number of pulses are applied to the pulse motor 37, which in turn commences rotation in correspondence with the number of pulses applied. By this rotation the drive gear 34 rotates the gear 33, which in turn causes a non-rotating back and forth movement of the tuning rod 30 with keep of screw action, thereby tuning the resonance frequency of the cavity 15 to meet a desired value.

FIG. 2 shows a detailed inner constitution of the preset device 12 as shown in FIG. 1. The device 12 drives in a preset mode the pulse motors 37, 51, 52 and 53 shown in FIG. 1. In the figure, a reference numeral 60 designates a pulse generator which generates pulses with a predetermined constant period, numerals 61, 62, 63 and 64 pulse motor selection switches, 65a, 65b, 65c and 65d a channel selection switches, and 70a-70d, 71a-71d, 72a-72d, 73a-73d memory units, an example of which is shown in detail in FIG. 3, in which only the memory unit 70a is illustrated as a representative. As shown, the memory unit 70a is provided with a preset counter 80 which gives an output when the output from the pulse generator 60 coincides with the preset value in the counter. The preset counter 80 may be of any type of well known counters. For example, the counter which can manually set a preset value of the one in which a counter and a preset memory is combined to transmit an output pulse when the output of the preset memory coincides with the counter output. The output of this counters 80 is applied to an AND gate 82 as one input thereof through a flip-flop 81. The output from the pulse generator 60 is directly applied to said AND gate 82 as the other input thereof. The gate 82, therefore, is enabled during the time corresponding to the value set in the preset counter 80 and the output from the pulse generator 60 is applied to the pulse motor 37 thereby energizing the motor 37.

With this constitution when the number of the pulses generated by the pulse generator 60 reaches the stored in advance in the preset counter 80, an output pulse is produced from the counter 80 and the operation of the counter stops. By this output pulse, the condition of the flip-flop 81 is inverted and the AND gate 82 which is kept opened before that time, is disabled by the output of the flip-flop 81. As a result, the number of the pulses corresponding to the stored number, is now applied to the pulse motor 37, thereby the motor 37 being rotated by a certain angle in correspondence with the number of pulses and the movable element 25 (FIG. 1), connected to the motor 37 being moved in the cavity up to a predetermined position.

Now, returning to FIG. 2, in the preset device 12 of FIG. 2 having a plurality of memory units shown in FIG. 3, pushing the channel selection switch 65a causes the pulse motor selection switches 61 through 64 to connect to the fixed terminal a in association with the switch 65a. As a result, each of memory units 70a, 71a, 72a and 73a is energized so as to select a particular channel allotted to the switch 65a and a predetermined driving pulses from each memory unit is applied thereto. The pulse motor, then, rotates in correspondence with the number of pulses applied while it stops rotating when the pulses terminate.

In this way, the cavity of each resonator is automatically set to the resonance frequency matched with the frequency band allotted by the channel selection switch 65a, respectively. In such an automatic adjustment as described above, each of pulse motor 37 and 51 through 53 and each of memory units starts, in principle, the operation from the reset condition. In other words, a reset is performed before operating, but this reset operation may be carried out by reset switches provided separately. There may be also used a gang switch which is capable of automatically performing a channel switching operation after the reset operation.

For getting back the state of the pulse motor to its reference position in every resetting to always commence it rotation therefrom, a certain time has to be unnecessarily wasted. Accordingly, if the difference between a channel position and the one to be changed is made to be stored in proper memory means, a quick channel change would be made possible by making the pulse motor carry out its rotation in accordance with the information stored above, thus obviating the resetting operation which wastes a time.

As described above, in the multi-cavity klystron device according to the present invention, predetermined different number of pulses are applied through memory units to each pulse motor coupled to each movable element provided in each cavity so as to vary the resonance frequency thereof and to rotate each pulse motor in correspondence with the number of pulses. Consequently, difficulty in the operation for changing channels that only a well-trained worker has been able to overcome is completely obviated by the present invention, and now there is provided a novel and simple structure for adjusting resonance frequency, which can be operated by even a beginner who is not trained in a special training course for a long time.

Further, in order to increase or decrease the number of channels, only simple modification would be needed, for instance modification of increasing or decreasing the number of memory units and the number of switches for selecting pulse motor and channel. According to the present invention, therefore, as compared with the prior art mechanical preset system, less consideration will be needed as to the spatial limitation for installing the device in designing the same. Further, the pulse motor makes it possible to control movable elements with high accuracy, and no mechanical impact is obviated in the process of changing channel, so that soomth and reliable channel change operation is readily made by anyone.

It should be apparent that the present invention may be modified without departing from the spirit of the invention.

What is claimed is:

1. A multi-cavity klystron device using a klystron of the type which includes an electron gun for generating an electron beam, a collector means for collecting the electron beam, and a high frequency circuit having a plurality of cavity resonators for making the electron beam interact with input micro waves, comprising a preset device and a tuning mechanism controlled by said preset device, said tuning mechanism including a plurality of movable elements, each of which is installed in each of said cavities for varying the resonant frequency of the cavity with each of said elements having a predetermined position within said cavity for each of certain predetermined klystron channel frequencies, a pulse motor associated each of said movable elements, and means for driving each of said movable elements in response to the rotation of said associated pulse motor, said preset device comprising a plurality of memory unit means for storing a set of values for each of said predetermined klystron channel frequencies, each of said sets of values comprising a preset value associated with each of said movable elements which corresponds to said predetermined position of said movable element for said corresponding predetermined klystron channel frequency with said memory unit means also including energizing means responsive to said preset values for providing pulsed voltage to each of said pulse motors for a selected one of said klystron channel frequencies so as to drive said pulse motors and said movable elements associated with said pulse motors until said elements are at said predetermined positions which correspond to said selected klystron channel frequency;

whereby said klystron is tuned to said selected klystron channel frequency.

2. A device according to claim 1 wherein said tuning mechanism includes a plurality of tuning rods and gears which are adapted to convert the rotating motion of said pulse motors into the linear motion of said movable elements.

3. A device according to claim 2 wherein each of said movable elements cooperates with a bellow for keeping vacuum in the cavity and said movable element is made to always receive a pulling force by a resilient member.

4. A device according to any of claim 1 or of claim 2 or of claim 3 wherein said memory unit means are divided into groups and wherein each of said groups is comprised of those memory unit means which store one of said sets of values which correspond to one of said predetermined klystron channel frequencies and wherein said device further comprises a plurality of channel selection switches, said channel selection switches being arranged to select one said group from said memory unit means groups, said selected group being made to apply said pulsed voltage to the corresponding pulse motors.

5. A device according to claim 4 wherein each of said memory unit means comprises a preset counter which is preset with said associated preset value, gating means controlled by said preset counter and means for interrupting the supply of pulsed voltage to said pulse motor from an output of said gating means when said preset counter counts said associated preset value, and wherein said energizing means further includes a pulse generator supplying said pulsed voltage at an output thereof to said preset counter as well as said gating means.

6. A device according to claim 5, wherein said interrupting means comprises a flip-flop for supplying an output thereof to said gating means so as to prevent said gating means from supplying said output of said gating means to said pulse motor.

7. A device according to claim 5 wherein said energizing means further comprises a plurality of pulse motor selection switches in cooperation with said channel selection switches, said pulse motor selecting switches being arranged to apply said output of said pulse generator to a selected one of said memory unit means groups.

8. A device according to claim 5 wherein said preset device further comprises reset means for resetting said preset counter.

9. A device according to claim 6 wherein said preset device further comprises reset means for resetting said preset counter and said flip-flop.

* * * * *

UNITED STATES PATENT AND TRADEMARK OFFICE
CERTIFICATE OF CORRECTION

PATENT NO. : 4,216,409

DATED : 8/5/80

INVENTOR(S) : Hisaaki Sato; Morio Shintani; Takayoshi Shinozaki Takuichi Tsuchiya; Toshio Asai It is certified that error appears in the above-identified patent and that said Letters Patent are hereby corrected as shown below:

| COLUMN | LINE | |
|--------|------|---|
| 6 | 60 | After the word "associated", insert --with--. |

Signed and Sealed this

Twenty-third Day of October 1984

[SEAL]

Attest:

Attesting Officer

GERALD J. MOSSINGHOFF

Commissioner of Patents and Trademarks